(12) United States Patent
Komura

(10) Patent No.: US 12,358,579 B2
(45) Date of Patent: Jul. 15, 2025

(54) SIX-WHEELED VEHICLE

(71) Applicant: TOYOTA JIDOSHA KABUSHIKI KAISHA, Aichi-ken (JP)

(72) Inventor: Hirotaka Komura, Tokyo-to (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/657,784

(22) Filed: May 8, 2024

(65) Prior Publication Data

US 2024/0375735 A1 Nov. 14, 2024

(30) Foreign Application Priority Data

May 12, 2023 (JP) .................. 2023-079326

(51) Int. Cl.
*B62D 61/10* (2006.01)
*B62D 7/14* (2006.01)

(52) U.S. Cl.
CPC ............. *B62D 61/10* (2013.01); *B62D 7/144* (2013.01)

(58) Field of Classification Search
CPC ........ B62D 61/10; B62D 7/144; B62D 11/02; B60G 1/00
See application file for complete search history.

(56) References Cited

U.S. PATENT DOCUMENTS

2024/0294218 A1* 9/2024 Kamikawa ................. B25J 5/00

FOREIGN PATENT DOCUMENTS

| CN | 108594832 A | * | 9/2018 | ............ B62D 61/10 |
| CN | 118235564 A | * | 6/2024 | |
| JP | 2014218183 A | * | 11/2014 | ............ B61B 13/00 |
| JP | 2018-094998 A | | 6/2018 | |
| JP | 2018-188064 A | | 11/2018 | |
| JP | 2020-151160 A | | 9/2020 | |
| JP | 2022-108529 A | | 7/2022 | |
| JP | 2023-006068 A | | 1/2023 | |
| KR | 100994383 B1 | * | 11/2010 | |
| KR | 102167310 B1 | * | 10/2020 | |
| KR | 102590323 B1 | * | 10/2023 | |

* cited by examiner

*Primary Examiner* — Drew J Brown
(74) *Attorney, Agent, or Firm* — HAUPTMAN HAM, LLP

(57) ABSTRACT

To realize a six-wheeled vehicle that can move omnidirectionally. A six-wheeled vehicle according to an embodiment of the present disclosure includes: a main body; middle wheels arranged on the left and right sides of the main body; front wheels arranged in front of the middle wheels; rear wheels arranged behind the middle wheels; and a drive mechanism configured to cause each of the middle wheels to turn about a steering axle extending in a vertical direction and to each of the middle wheels to rotate about a vehicle axle.

5 Claims, 4 Drawing Sheets

SIX-WHEELED VEHICLE

CROSS REFERENCE TO RELATED APPLICATIONS

This application is based upon and claims the benefit of priority from Japanese patent application No. 2023-079326, filed on May 12, 2023, the disclosure of which is incorporated herein in its entirety by reference.

BACKGROUND

The present disclosure relates to a six-wheeled vehicle.
Japanese Unexamined Patent Application Publication No. 2022-108529 discloses a six-wheeled paddy field work vehicle equipped with a pair of front wheels, a pair of middle wheels, and a pair of rear wheels.

SUMMARY

A conventional six-wheeled vehicle has difficulty in moving omni-directionally.

The present disclosure is made in view of the problem mentioned above and realizes a six-wheeled vehicle capable of moving omni-directionally.

According to an aspect of the present disclosure, a six-wheeled vehicle includes:
a main body;
middle wheels arranged on the left and right sides of the main body;
front wheels arranged in front of the middle wheels;
rear wheels arranged behind the middle wheels; and
a drive mechanism configured to cause each of the middle wheels to turn about a steering axle extending in a vertical direction and each of the middle wheels to rotate about a vehicle axle.

According to the present disclosure, it is possible to realize a six-wheeled vehicle capable of moving omni-directionally.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Reference Example

Figure 1:
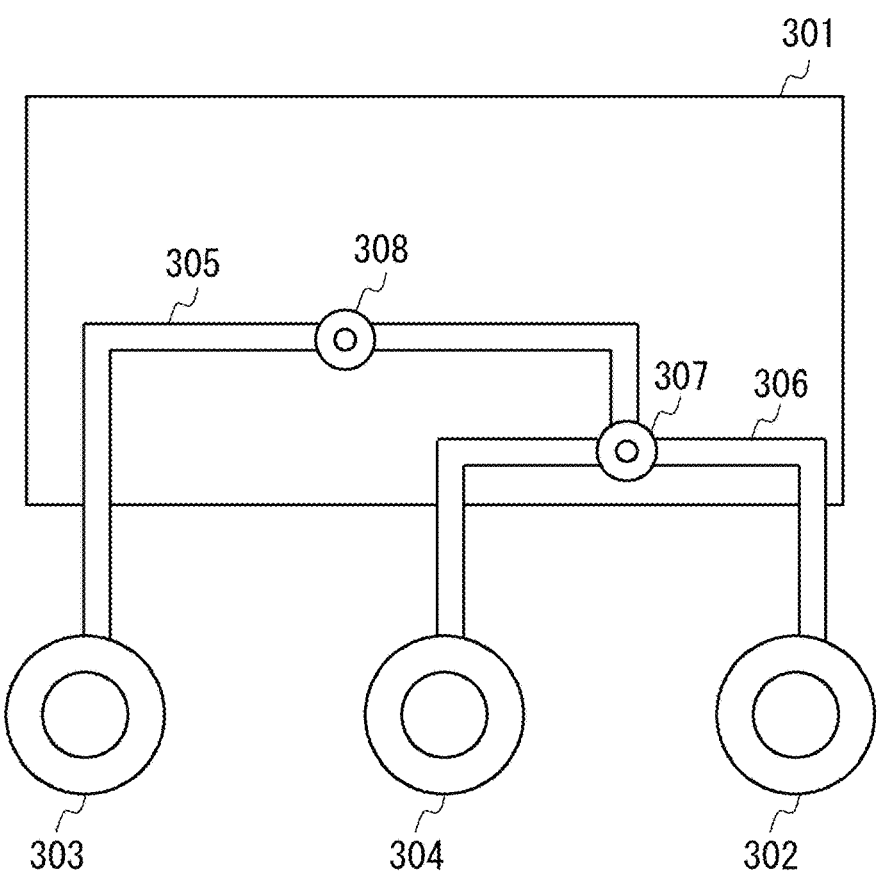
FIG. 1 is an explanatory diagram showing a configuration of a rocker bogie according to a reference example.

A rocker bogie 300 according to a reference example will be described with reference to FIG. 1. A pair of front wheels 302 is arranged in the front part of a main body 301 of the rocker bogie 300, and a pair of rear wheels 303 is arranged in the rear part of the main body 301 of the rocker bogie 300. A pair of middle wheels 304 is arranged in the center part of the main body 301. A rocker link 305 supports the rear wheels 303. A bogie link 306 supports the front wheels 302 and the middle wheels 304. The bogie link 306 is supported at one end of the rocker link 305 so that it can swing about a rocker shaft 307. The rocker link 305 is supported by the main body 301 so that it can swing about a rocker shaft 308. The pair of the rocker links 305 are interconnected via a differential gear, and it is common to connect the rocker link 305 and the main body 301 via a differential gear.

At least one of the front wheels 302, the rear wheels 303, and the middle wheels 304 are driving wheels. The rocker bogie 300 can turn, for example, by stopping one of the driving wheels and rotating the other one of the driving wheels. When the rocker bogie 300 travels on rugged ground, each of the wheels comes in smooth contact with the surface of the ground.

First Embodiment

Figure 2:
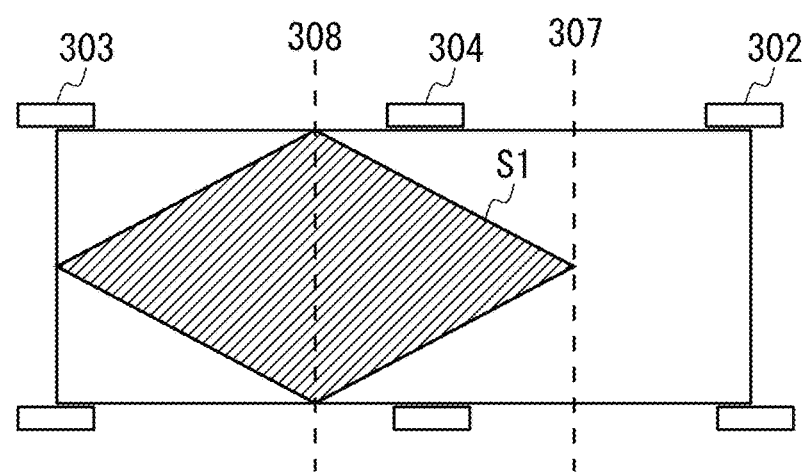
FIG. 2 is an explanatory diagram showing a support polygon of the rocker bogie according to the reference example.

First, the problems as regards the rocker bogie 300 according to the above reference example found by the inventors of the present disclosure will be explained. FIG. 2 is an explanatory diagram showing a support polygon of the rocker bogie 300. Since the bogie link 306 is supported by the rocker link 305, an area S1 of the support polygon of the rocker bogie 300 is small. Therefore, the rocker bogie 300 has a problem that it easily loses balance. The rocker bogie 300 also has a problem that it cannot move omni-directionally. Therefore, according to a first embodiment, it is possible to realize a six-wheeled vehicle that is less likely to lose balance and can move omni-directionally.

Hereinafter, a six-wheeled vehicle according to the first embodiment will be described focusing attention on the differences with the rocker bogie 300 according to the comparative example. The same components/elements are denoted by the same reference symbols, and descriptions thereof will be omitted where appropriate.

Figure 3:
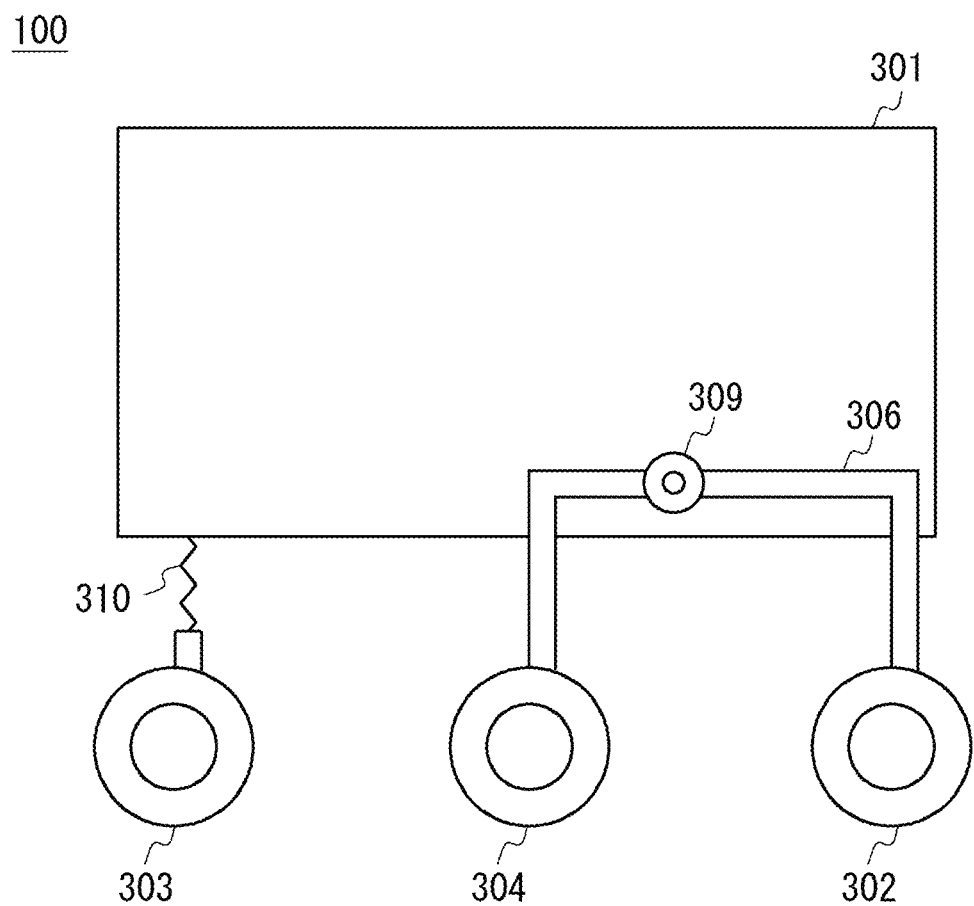
FIG. 3 is an explanatory diagram showing a configuration of a six-wheeled vehicle according to a first embodiment.

FIG. 3 is an explanatory diagram showing a configuration of a six-wheeled vehicle 100. The six-wheeled vehicle 100 includes the main body 301, a pair of the front wheels 302, a pair of the rear wheels 303, a pair of the middle wheels 304, a pair of the bogie links 306, a rocker shaft 309, and a suspension 310. The right side of FIG. 3 is the front side of the six-wheeled vehicle 100, and the left side of FIG. 3 is the rear side of the six-wheeled vehicle 100. The depth side of FIG. 3 is the lateral side of the six-wheeled vehicle 100.

A pair of the front wheels 302 are arranged on the left and right sides of the main body 301. A pair of the front wheels 302 are arranged in front of a pair of the middle wheels 304. A pair of the front wheels 302 may be driven wheels.

A pair of the rear wheels 303 are arranged on the left and right sides of the main body 301. A pair of the rear wheels 303 are arranged behind the pair of the middle wheels 304. A pair of the rear wheels 303 may be driven wheels.

A pair of the middle wheels 304 are arranged on the left and right sides of the main body 301. Each of the middle wheels 304 is an active caster that rotates about a vehicle axle and turns about a steering axle extending in a vertical direction. The vehicle axle is horizontally offset in a direction orthogonal to the axial direction of the vehicle axle with respect to the steering axle.

The front wheels 302 and the rear wheels 303 may be free casters. The free casters are configured to be rotatable about a vehicle axle and turnable about a swiveling axle extending in a vertical direction. The vehicle axle is horizontally offset in a direction orthogonal to the axial direction of the vehicle axle with respect to the swiveling axle.

The pair of the bogie links 306 are disposed on the left and right sides of the main body 301. Each of the bogie links 306 is supported by the main body 301 so that it can swing about the rocker shaft 309 extending in the lateral direction. The rocker shaft 309 may be positioned on the rear side of the six-wheeled vehicle 100 in the longitudinal direction with respect to the center of the bogie link 306. In this case, it is easy for the middle wheels 304, which are active casters, to come in contact with the surface of the ground.

The bogie link 306 supports the front wheels 302 and the rear wheels 303. The bogie link 306 may be a substantially U-shaped (U-shaped) member. The bogie link 306 may include, for example, a main body extending in a longitudinal direction and two leg parts extending in a vertical direction. The two leg parts are connected to both ends of the main body. The middle wheels 304 and the front wheels 302 are connected to two leg parts.

The suspension 310 is arranged between the main body 301 and each of the rear wheels 303. The suspension 310 expands and contracts in a vertical direction. The suspension 310 is, for example, a spring suspension including springs (e.g., a coil spring).

Figure 4:
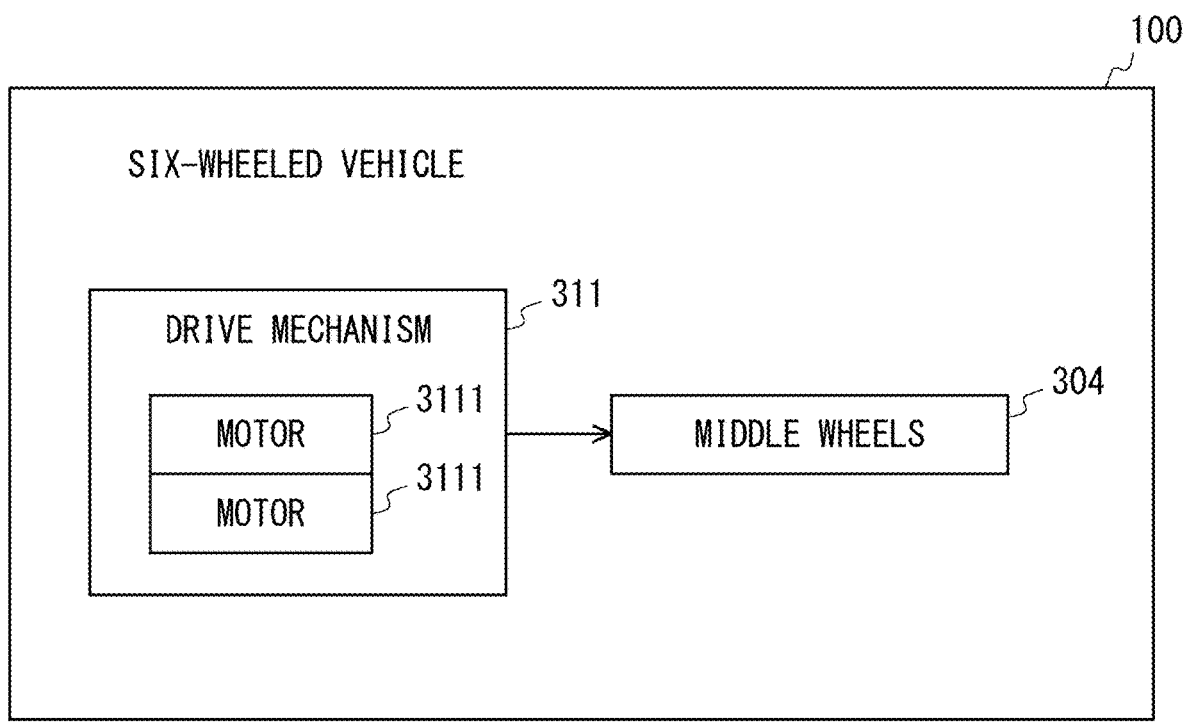
FIG. 4 is a block diagram showing functions of the six-wheeled vehicle according to the first embodiment.

FIG. 4 is a block diagram illustrating the functions of the six-wheeled vehicle 100. The six-wheeled vehicle 100 includes a drive mechanism 311. The drive mechanism 311 includes two motors 3111. The two motors 3111 may be provided for each of the middle wheels 304.

One of the two motors 3111 may rotate the middle wheels 304 about the vehicle axle and the other of the two motors 3111 may turn the middle wheels 304 about the steering axle. Also, the middle wheels 304 may rotate about the vehicle axle when the two motors 3111 rotate simultaneously, and the middle wheels 304 may turn about the steering axle when the two motors 3111 rotate simultaneously. That is, the drive mechanism 311 may be an interference drive mechanism.

The six-wheeled vehicle 100 may include sensors such as a camera, radar, LIDAR, etc. A control unit (not shown) may transmit a control signal based on data collected by the sensor to the drive mechanism 311, allowing the six-wheeled vehicle 100 to move autonomously.

Figure 5:
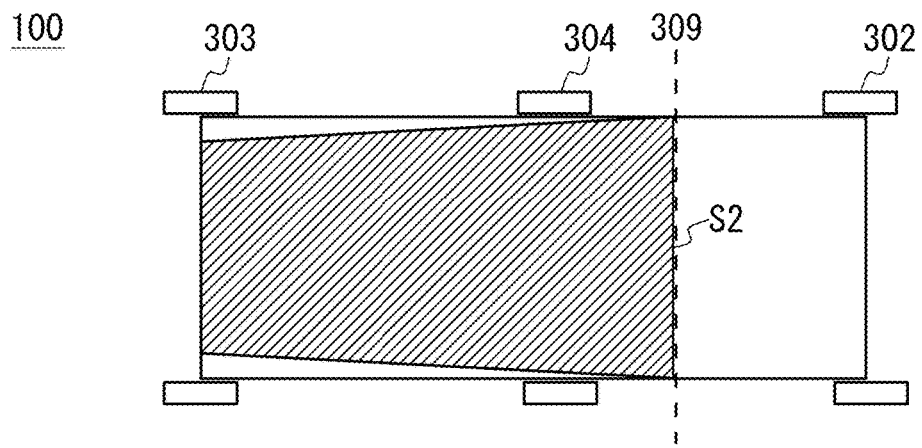
FIG. 5 is an explanatory diagram showing a support polygon of the six-wheeled vehicle according to the first embodiment.

FIG. 5 is an explanatory diagram showing a support polygon of the six-wheeled vehicle 100. Support polygon has a trapezoidal shape by providing the suspension 310. The area S2 of support polygon is larger than the area S1 shown in FIG. 2. Since the six-wheeled vehicle 100 does not include a rocker link, the stability is higher than that of the rocker bogie 300.

The position of the center of gravity of the six-wheeled vehicle 100 may be located on the rear side of the six-wheeled vehicle 100 in the longitudinal direction with respect to the center of the six-wheeled vehicle 100. If the position of the center of gravity of the six-wheeled vehicle 100 is located on the front side of the six-wheeled vehicle 100 with respect to the rocker shaft 309, the six-wheeled vehicle 100 may lose balance.

The six-wheeled vehicle 100 does not include a rocker link, but because the suspension 310 is arranged between the main body 301 and each of the rear wheels 303, the middle wheels 304 which are active casters can be brought in contact with the surface of the ground. The six-wheeled vehicle 100 has the bogie link 306, so it can travel on rugged ground.

The six-wheeled vehicle 100 has the middle wheels 304 which are active casters, so it can move omni-directionally. The six-wheeled vehicle 100 does not need to have omni wheels or mechanum wheels that generate noise. Also, because the middle wheels 304 are less slippery than omni wheels and mechanum wheels, the six-wheeled vehicle 100 can easily travel up a slope and over a ramp.

Figure 6:
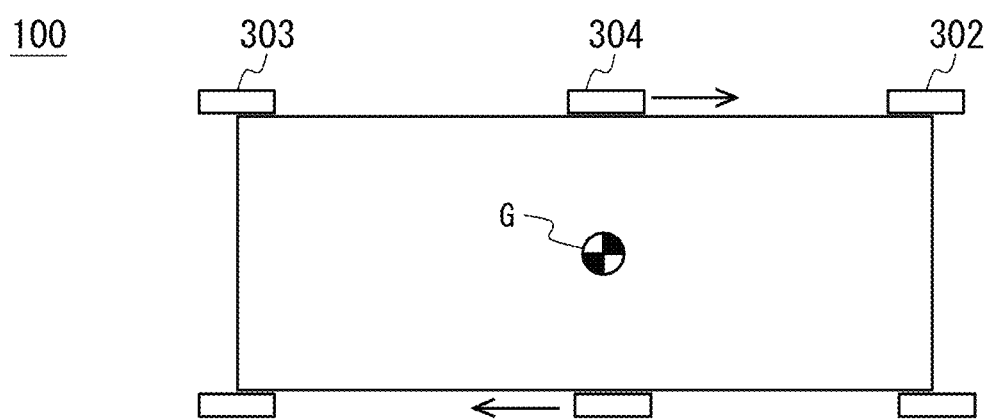
FIG. 6 is an explanatory diagram illustrating a turning operation of the six-wheeled vehicle according to the first embodiment.

Further, the six-wheeled vehicle 100 can turn more easily when the middle wheels 304 are active casters than when the front wheels 302 or the rear wheels 303 are active casters. That is, the six-wheeled vehicle 100 can turn with a little force and is not slippery when turning. FIG. 6 is an explanatory diagram showing the turning operation of the six-wheeled vehicle 100. The six-wheeled vehicle 100 can easily turn in place by, for example, rotating one of the pair of the middle wheels 304 in one direction and the other of the pair of the middle wheels 304 in direction opposite to the one direction.

The symbol G denotes the position of the vehicle's center of gravity. The distance from the middle wheels 304 to the center of gravity is shorter than the distance from the front wheels 302 to the center of gravity and shorter than the distance from the rear wheels 303 to the center of gravity. Thus, the six-wheeled vehicle 100 can turn with less force than when the front wheels 302 or the rear wheels 303 are active casters.

Furthermore, the six-wheeled vehicle 100 can travel over a ramp with a smaller driving force compared to a four-wheel vehicle. Also, if the front wheels 302 and the rear wheels 303 are driven wheels, there is an advantage that the number of driving wheels can be kept small.

The diameter of the middle wheels 304 may be determined according to the height of ramp present on the rugged ground on which the six-wheeled vehicle 100 travels. When the middle wheels 304 are active casters and the front wheels 302 and the rear wheels 303 are driven casters, the diameter of the middle wheels 304 provided in the center part of the main body 301 is large, which is advantageous in terms of design.

It should be noted that the present disclosure is not limited to the above embodiments and can be suitably changed to the extent that it does not deviate from the gist of the present disclosure.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A six-wheeled vehicle, comprising:
a main body;
middle wheels arranged on left and right sides of the main body;
front wheels arranged in front of the middle wheels;
rear wheels arranged behind the middle wheels;
a drive mechanism configured to cause each of the middle wheels to turn about a steering axle extending in a vertical direction and each of the middle wheels to rotate about a vehicle axle;
a rocker shaft extending in a lateral direction;
bogie links connected to the front wheels and the middle wheels, and supported by the main body to swing about the rocker shaft; and
a suspension connecting the main body and each of the rear wheels, the suspension arranged away from the rocker shaft and the bogie links in a longitudinal direction, and configured to expand and contract in the vertical direction.

2. The six-wheeled vehicle according to claim 1, wherein the front wheels and the rear wheels are driven wheels.

3. The six-wheeled vehicle according to claim 1, wherein the rocker shaft is located on a rear side of the six-wheeled vehicle in the longitudinal direction with respect to a center of each of the bogie links.

4. The six-wheeled vehicle according to claim 1, wherein the rear wheels are connected to the main body independently from the front wheels and the middle wheels.

5. The six-wheeled vehicle according to claim 4, wherein each of the bogie links includes
 a main part extending in the longitudinal direction, and
 two leg parts extending from two ends of the main part in the vertical direction, respectively, wherein one of the two leg parts is connected to a front wheel of the front wheels, and the other of the two leg parts is connected to a middle wheel of the middle wheels.

* * * * *